(12) United States Patent
Gasparri et al.

(10) Patent No.: US 12,246,776 B2
(45) Date of Patent: Mar. 11, 2025

(54) SYSTEM FOR INSULATING A STRUCTURAL ELEMENT

(71) Applicant: SIKA TECHNOLOGY AG, Baar (CH)

(72) Inventors: Thomas Gasparri, Mignault (BE); Nicolas Brichet, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 411 days.

(21) Appl. No.: 17/269,426

(22) PCT Filed: Aug. 27, 2019

(86) PCT No.: PCT/EP2019/072884
§ 371 (c)(1),
(2) Date: Feb. 18, 2021

(87) PCT Pub. No.: WO2020/043739
PCT Pub. Date: Mar. 5, 2020

(65) Prior Publication Data
US 2021/0179191 A1 Jun. 17, 2021

(30) Foreign Application Priority Data
Aug. 31, 2018 (EP) .................................... 18192073

(51) Int. Cl.
*B62D 25/20* (2006.01)
*B29C 65/52* (2006.01)
(Continued)

(52) U.S. Cl.
CPC ............ *B62D 25/20* (2013.01); *B29C 65/525* (2013.01); *B60R 13/083* (2013.01); *B62D 27/00* (2013.01);
(Continued)

(58) Field of Classification Search
CPC ...... B62D 25/20; B62D 27/00; B62D 29/002; B62D 25/00; B29C 65/525; B29C 44/18;
(Continued)

(56) References Cited

U.S. PATENT DOCUMENTS

| 5,266,133 A | 11/1993 | Hanley et al. |
| 5,358,397 A | 10/1994 | Ligon et al. |

(Continued)

FOREIGN PATENT DOCUMENTS

| CN | 1531489 A | 9/2004 |
| CN | 102177013 A | 9/2011 |

(Continued)

OTHER PUBLICATIONS

Mar. 2, 2021 International Preliminary Report on Patentability issued in International Patent Application No. PCT/EP2019/072884.

(Continued)

*Primary Examiner* — Amy R Weisberg
*Assistant Examiner* — Dana D Ivey
(74) *Attorney, Agent, or Firm* — Oliff PLC

(57) ABSTRACT

A system for insulating a structural element in a motor vehicle, including a structural element and a device arranged thereon and having a carrier. The system also includes an expandable adhesive, which is arranged on the structural element or on the carrier via pumping or via extrusion. The carrier and the expandable adhesive are designed and arranged in such a way that the carrier limits the expandable adhesive in at least one direction during the expansion of same.

16 Claims, 4 Drawing Sheets

(51) Int. Cl.
*B60R 13/08* (2006.01)
*B62D 27/00* (2006.01)
*B29C 44/18* (2006.01)
*B29L 31/30* (2006.01)
*B62D 25/00* (2006.01)
*B62D 29/00* (2006.01)

(52) U.S. Cl.
CPC ............ *B29C 44/18* (2013.01); *B29C 44/188* (2013.01); *B29L 2031/30* (2013.01); *B29L 2031/3002* (2013.01); *B62D 25/00* (2013.01); *B62D 29/002* (2013.01)

(58) Field of Classification Search
CPC . B29C 44/188; B60R 13/083; B29L 2031/30; B29L 2031/3002
USPC ........................................ 296/193.07, 187.02
See application file for complete search history.

(56) References Cited

U.S. PATENT DOCUMENTS

| | | | |
|---|---|---|---|
| 6,103,341 | A | 8/2000 | Barz et al. |
| 6,247,287 | B1 | 6/2001 | Takabatake |
| 7,043,815 | B2 | 5/2006 | Lande et al. |
| 7,077,461 | B2 * | 7/2006 | Ratet ........................ B29C 44/18 296/187.05 |
| 7,479,245 | B2 | 1/2009 | Barz et al. |
| 7,597,382 | B2 * | 10/2009 | Vilcek ...................... B29C 44/18 296/193.06 |
| 8,215,704 | B2 * | 7/2012 | Monnet ................ B62D 29/002 296/193.06 |
| 8,770,340 | B2 * | 7/2014 | Cursetjee ................. F24F 13/24 181/290 |
| 2003/0137162 | A1 | 7/2003 | Kropfeld |
| 2004/0239148 | A1 | 12/2004 | Ratet |
| 2004/0255546 | A1 | 12/2004 | Sophiea et al. |
| 2006/0127584 | A1 | 6/2006 | Lande et al. |
| 2010/0092733 | A1 | 4/2010 | Blank et al. |
| 2010/0314813 | A1 * | 12/2010 | Wojtowicki ............ C08L 53/02 524/505 |
| 2015/0352930 | A1 | 12/2015 | Belpaire et al. |
| 2018/0037708 | A1 | 2/2018 | Lin et al. |

FOREIGN PATENT DOCUMENTS

| | | |
|---|---|---|
| DE | 60204736 T2 | 2/2006 |
| DE | 10 2015 002 262 A1 | 8/2015 |
| EP | 1 155 084 A1 | 11/2001 |
| EP | 1 932 648 A1 | 6/2008 |
| EP | 3281970 A1 | 2/2018 |
| EP | 1 731 284 B1 | 8/2019 |
| GB | 2463858 A | 3/2010 |
| WO | 00/27920 A1 | 5/2000 |
| WO | 03/089221 A1 | 10/2003 |
| WO | 2008/065049 A1 | 6/2008 |
| WO | 2010/014565 A1 | 2/2010 |
| WO | 2010/023324 A1 | 3/2010 |
| WO | 2010/060241 A1 | 6/2010 |
| WO | 2010/128064 A1 | 11/2010 |
| WO | 2011/131334 A1 | 10/2011 |
| WO | 2014/095620 A1 | 6/2014 |
| WO | 2014/124924 A1 | 8/2014 |

OTHER PUBLICATIONS

Nov. 8, 2019 Search Report issued in International Patent Application No. PCT/EP2019/072884.
Morel, N., "Lighter Vehicle Starts with Sika," GALM Birmingham, Nov. 2016.
Souvay, D., "Car Body Reinforcement with Sika," GALM Birmingham, Apr. 2017.
L-0507 technical data sheet (2014).
Sika 2015 Brochure: "Acoustic Systems Quieter Rides Start with Sika".
Zalobsky, A. and Chang, C., "Recommendations on Selection and Use of Cavity Reinforcement Materials," Sika Corporation 1999.
Mar. 7, 2024 Notice of Opposition in European Application 19758417.0.

* cited by examiner

SYSTEM FOR INSULATING A STRUCTURAL ELEMENT

The invention relates to a system for insulating a structural element in a motor vehicle. It also relates to a method for insulating a structural element in a motor vehicle.

In many cases, components, such as for example bodies and/or frames of transportation and conveyance means, in particular of aquatic or terrestrial vehicles or of aircraft, have structures with cavities in order to make lightweight constructions possible. However, these cavities cause a wide variety of problems. Depending on the nature of the cavity, it has to be sealed in order to prevent the ingress of moisture and dirt, which can lead to corrosion of the components. It is often also desirable to substantially reinforce the cavities, and thus the component, but to retain the low weight. It is often also necessary to stabilize the cavities, and thus the components, in order to reduce noises which would otherwise be transmitted along or through the cavity. Many of these cavities have an irregular shape or a narrow extent, making it more difficult to seal, reinforce and damp them properly.

In particular in automotive construction, but also in aircraft construction and boat building, sealing elements (baffles) are therefore used in order to seal and/or acoustically isolate cavities, or reinforcing elements (reinforcers) are used in order to reinforce cavities.

FIG. 1 schematically illustrates a body of an automobile. Here, the vehicle body 10 has various structures with cavities, such as for example pillars 14 and carriers or braces 12. Such structural elements 12, 14 with cavities are usually sealed and/or reinforced, respectively, using sealing and/or reinforcing elements 16.

FIGS. 2a and 2b schematically show a known concept for the sealing and/or reinforcing closure of openings and/or cavities in a motor vehicle.

Here, FIG. 2a shows a device 16 prior to an expansion of an adhesive 13. FIG. 2b shows the same device 16 as a constituent part of the system 1 but after the adhesive 13 has been expanded, that is to say with the expanded adhesive 13'.

The device 16 is located in a cavity of a vehicle body structure, as is illustrated for example in FIG. 1. A portion of such a structural element 12, 14 of a vehicle body is schematically illustrated in FIGS. 2a and 2b. The device 16 comprises a carrier 11, which has an edge region 21. The adhesive 13 is in this case arranged substantially on this edge region 21 of the carrier 11.

A gap exists between the device 16 and the structural element 12, 14 prior to the expansion of the adhesive 13. Said gap makes it possible to coat the structural element 12, 14 in order to achieve corrosion protection of the structural element 12, 14. After this coating, the adhesive 13 is usually expanded by the action of heat, the expanded adhesive 13' closing the gap between the device 16 and the structural element 12, 14 as a result. Fixing of the device 16' in the structural element 12, 14 is moreover also simultaneously achieved as a result of the expansion of the adhesive 13. A device 16' that is fastened in the structural element 12, 14 in this way on the one hand reinforces the structural element 12, 14 and on the other hand closes the cavity in the structural element 12, 14.

A disadvantage of the previously known sealing and/or reinforcing elements is that the production of these elements is relatively complex, laborious and cost-intensive.

Furthermore, the known sealing and/or reinforcing elements have the disadvantage that they have only limited storability. The reason for this in particular is because the adhesive cannot be stored on the elements for any length of time desired or under extreme conditions.

It is therefore an object of the present invention to provide an improved system for insulating a structural element in a motor vehicle that avoids the disadvantages of the prior art. In particular, the system should give rise to economic advantages and additionally simplify and/or improve the associated logistics, and in particular the storability.

Said object is achieved by a system for insulating a structural element in a motor vehicle, the system comprising: a structural element having a first constituent part and a second constituent part, wherein the constituent parts are joined at a first joining point and at a second joining point, and wherein the structural element forms a cavity; a device having a carrier, wherein the carrier is arranged on the structural element by virtue of a fastening element; and an expandable adhesive, which is arranged on the structural element or on the carrier by pumping or by extruding; wherein the carrier and the expandable adhesive are formed and arranged in such a way that the carrier delimits the expandable adhesive in at least one direction as said adhesive expands.

Firstly, this solution has the advantage that, as a result, the device can be produced significantly more simply and cost-effectively in comparison with the prior art. In particular, as per the system proposed here, a device which is in one piece and/or constructed from only one material and/or produced in one step can be used. Consequently, for example, a one-component injection-molding process can be used instead of a two-component injection-molding process. This lowers both the effective costs of the production and an outlay when planning and configuring the device.

A core concept of the present invention is that the expandable adhesive is not arranged on the carrier before the device is fastened in the structural element, but rather that the device is fastened in the structural element without adhesive and the expandable adhesive is introduced separately into the system. This has the advantage that the device can be transported and stored much better without the adhesive. This significantly reduces associated logistics costs. In this respect, in a production line of the motor vehicles, the expandable adhesive can be re-administered in each case into the system, for example in the form of bulk product.

A further advantage of the system proposed here can be considered that of being able to better reinforce, seal, damp or insulate locations in the cavity of the structural element that are difficult to access by virtue of the separate application of the expandable adhesive than is possible with the systems mentioned in the introduction. In particular, the expandable adhesive can completely fill joining points even before it is activated.

Furthermore, the solution proposed here has the advantage that, by means of a (standardized) device, a variety of structural elements can be insulated by using a different amount and/or arrangement of the expandable adhesive in each case. Thus, for example, a first structural element with a larger cavity can be insulated by means of the standard device and a larger amount of expandable adhesive, and a second structural element with a smaller cavity can be insulated by means of the same standard device and a smaller amount of expandable adhesive.

Consequently, fewer different devices have to be produced, with the result that the overall costs of the system can be reduced by virtue of greater numbers of items, fewer tools and simpler logistics.

In the context of this invention, the designation "insulation" or "insulated" comprises elements or functions or structures or method steps for isolating and/or closing and/or reinforcing and/or damping and/or insulating a structural element. These various properties of such an insulation can in this case arise individually or else in combination with one another.

The structural element comprises at least a first constituent part and a second constituent part which are joined together at a first joining point and at a second joining point and thus form a cavity. In this case, the first and the second constituent part of the structural element can be composed in each case of one element or else of a plurality of elements. The structural element can therefore also have more than two joining points.

In one exemplary embodiment, the system comprises a plurality of devices having a carrier and a fastening element. By way of example, the system comprises two devices, three devices, four devices, five devices, more than two devices, more than three devices, more than four devices, or more than five devices.

In this case, both the shape and the materials of said plurality of devices can in each case be the same or different.

In one exemplary embodiment, the carrier is arranged on the first constituent part of the structural element, and the expandable adhesive is arranged on the second constituent part of the structural element.

In an alternative embodiment, the carrier is arranged on the first constituent part of the structural element, and the expandable adhesive is likewise arranged on the first constituent part of the structural element.

In an alternative refinement, the carrier is arranged on the first constituent part of the structural element, and the expandable adhesive is arranged on the first constituent part and on the second constituent part of the structural element.

In a further alternative embodiment, the carrier is arranged on the first constituent part of the structural element, and the expandable adhesive is arranged on the carrier.

In one exemplary embodiment, the carrier substantially has an L-shaped or an I-shaped or an H-shaped or a C-shaped or a T-shaped or a W-shaped or a V-shaped or a U-shaped or an N-shaped or a Z-shaped or an O-shaped or a rectangular or an oval or a round or a trapezoidal or a triangular or a polygonal cross section.

In one exemplary embodiment, the carrier has a base and a wing.

In one exemplary refinement, the fastening element is arranged on the base and the wing delimits the expansion of the expandable adhesive in at least one direction.

In one exemplary refinement, the wing forms an angle with the base of between 60° and 160° or of between 70° and 150° or of between 80° and 140°.

In one exemplary embodiment, the device or just the carrier is produced by an injection-molding process.

In one exemplary refinement, the device or just the carrier is produced by a one-component injection-molding process.

In an alternative embodiment, the device or just the carrier is produced by an extrusion process.

In one exemplary embodiment, the carrier and the fastening element are formed in one piece.

In a further exemplary embodiment, the carrier and the fastening element are formed from the same material.

In one exemplary embodiment, the carrier comprises a plastic, in particular polyamide.

In one exemplary embodiment, the carrier comprises a fiber-reinforced plastic, in particular a glass fiber-reinforced or carbon fiber-reinforced plastic.

In principle, the carrier can consist of a variety of materials. Preferred materials are plastics, in particular polyurethanes, polyamides, polyesters and polyolefins, preferably polymers which can withstand high temperatures such as poly(phenylene ethers), polysulfones or polyether sulfones, which in particular are also foamed; metals, in particular aluminum and steel; or grown organic materials, in particular wood materials or other (densified) fibrous materials, or glass-type or ceramic materials; especially also foamed materials of this type; or any desired combinations of these materials. Polyamide, in particular polyamide 6, polyamide 6.6, polyamide 11, polyamide 12, or a mixture thereof, is particularly preferably used. Combinations with fibers, such as, for example, glass fibers or carbon fibers, are also possible.

Furthermore, the carrier can have any desired construction and any desired structure. It may be solid, hollow, or foamed, or have a grid-like structure, for example. Typically, the surface of the carrier may be smooth, rough or structured.

In one exemplary embodiment, the device has a substantially circular or oval or elongate or irregularly shaped outline.

In one exemplary embodiment, the expandable adhesive has an expansion rate of at least 200% or of at least 300% or of at least 400% or of at least 500% or of at least 800%.

Such an expandable and pumpable adhesive is described, by way of example, in European patent application EP 3 281 970 A1.

An example of such an expandable, pumpable adhesive is an adhesive that can be obtained under the trade name Sikaseal®.

An example of an expandable adhesive which can be extruded can be obtained under the name Sika Baffle® 455.

In one exemplary embodiment, the expandable adhesive is arranged on the second constituent part of the structural element in the form of a bead or a plurality of beads.

In one exemplary embodiment, the expandable adhesive is arranged on the second constituent part of the structural element by a robot.

In one exemplary embodiment, the at least one bead has a diameter of from 2 to 20 mm or of from 4 to 18 mm or of from 6 to 16 mm.

In one exemplary embodiment, the at least one bead has a length of at least 10 mm or of at least 20 mm or of at least 30 mm or of at least 50 mm or of at least 100 mm.

In one exemplary embodiment, the expandable adhesive is in contact with the structural element at the first joining point and at the second joining point.

In one exemplary embodiment, in the region of the first and the second joining point, the expandable adhesive in each case touches both the first constituent part of the structural element and the second constituent part of the structural element.

In one exemplary embodiment, the expandable adhesive has, in each case proceeding from the joining points, an extent along the second constituent part of the structural element of at least 10 mm or of at least 15 mm or of at least 20 mm or of at least 30 mm or of at least 40 mm.

In one exemplary embodiment, the expandable adhesive forms a continuous element between the first joining point and the second joining point.

In one exemplary embodiment, the expandable adhesive forms a single cohesive element. In an alternative embodiment, a plurality of non-cohesive expandable adhesives forms a plurality of non-cohesive elements.

In one exemplary embodiment, the expandable adhesive is a pumpable or extrudable material.

In one exemplary embodiment, the expandable adhesive is pumpable at a temperature of less than 80° C., preferably of less than 70° C., preferably of less than 60° C., particularly preferably of less than 50° C.

In one exemplary embodiment, the expandable adhesive is extrudable at a temperature of less than 100° C., preferably of less than 90° C., preferably of less than 80° C., particularly preferably of less than 70° C.

In one exemplary embodiment, the expandable adhesive is pumpable or extrudable at a temperature which is below an activation temperature of the second expandable adhesive by at least 20 K or by at least 30 K or by at least 40 K or by at least 50 K or by at least 60 K.

In one exemplary embodiment, the fastening element is in the form of a clip.

In an alternative embodiment, the fastening element is in the form of a welding tab or in the form of a magnetic element or in the form of an adhesive or in the form of a hook.

In one exemplary embodiment, the structural element has an opening, wherein the carrier is arranged in such a way that the opening is free of expanded adhesive after the expandable adhesive has been expanded.

Such an arrangement of the carrier has the advantage that, as a result, openings in the structural element, as are used for example for cable leadthroughs or the like, can be kept free of expanded adhesive such that the function of such openings is not adversely affected.

In one exemplary embodiment, a distance between the carrier and the structural element amounts to between 2 and 6 mm or between 3 and 5 mm.

The object set in the introduction is additionally achieved by a method for insulating a structural element in a motor vehicle, the method comprising the steps of: providing a device having a carrier; arranging the device on the structural element; arranging an expandable adhesive on the structural element or on the carrier by pumping or by extruding; joining a first constituent part and a second constituent part of the structural element to form the structural element, wherein the device and the expandable adhesive are arranged in a cavity between the constituent parts of the structural element; and expanding the expandable adhesive, wherein the carrier delimits the expansion of the expandable adhesive in at least one direction.

In one exemplary embodiment, the expandable adhesive is arranged by pumping at a temperature of less than 80° C. or of less than 70° C. or of less than 60° C. or of less than 50° C.

In one exemplary embodiment, the expandable adhesive is arranged by extruding at a temperature of less than 100° C. or of less than 90° C. or of less than 80° C. or of less than 70° C.

In one exemplary embodiment, the expandable adhesive is expanded at a temperature of more than 100° C. or of more than 110° C. or of more than 120° C. or of more than 140° C.

In one exemplary embodiment, the method is carried out by a system according to the description above.

In one exemplary embodiment, the expandable adhesive is arranged on the structural element or the carrier by a robot.

In one exemplary embodiment, the expandable adhesive is pumped or extruded onto the second constituent part of the structural element.

In one exemplary embodiment, the adhesive is arranged on the structural element or the carrier before or after the arrangement of the device on the first constituent part of the structural element.

In one exemplary embodiment, heat is employed during the activation of the expandable adhesive, in particular the adhesive is activated in a finishing oven or in a corrosion-protection oven.

Details and advantages of the invention will be described below on the basis of exemplary embodiments and with reference to schematic drawings, in which.

Figure 1:
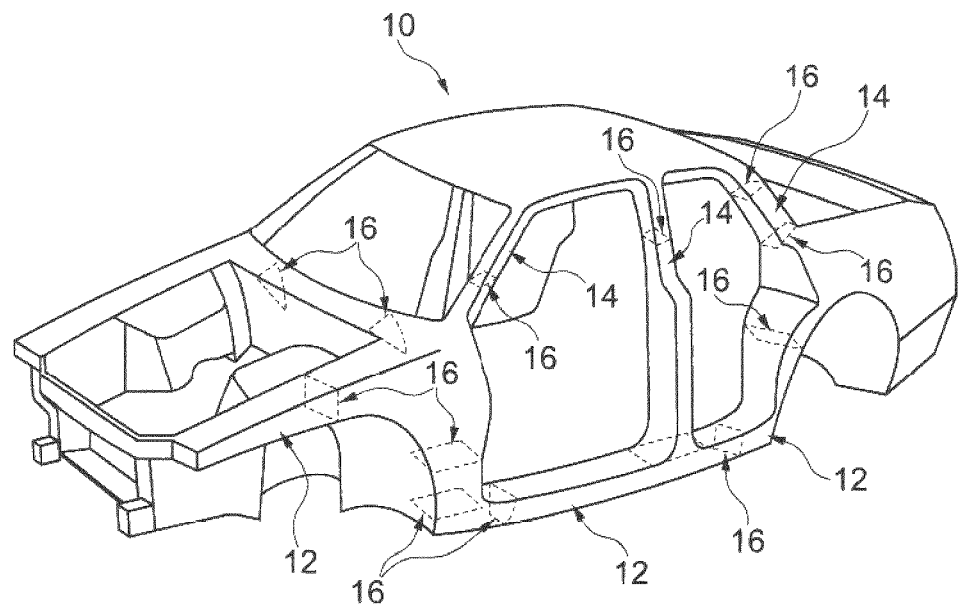
FIG. 1 shows an exemplary illustration of a vehicle body according to the prior art.
Figure 2A:
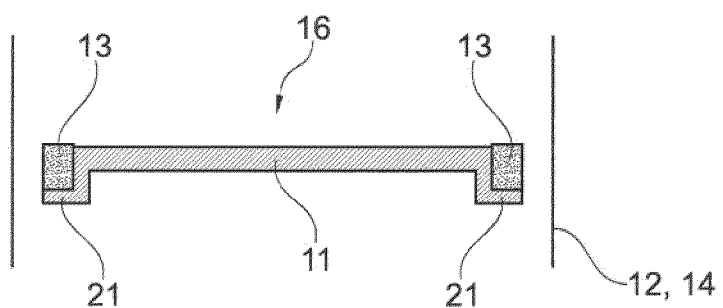
FIGS. 2a and 2b show schematic illustrations of an exemplary device according to the prior art.
Figure 2B:
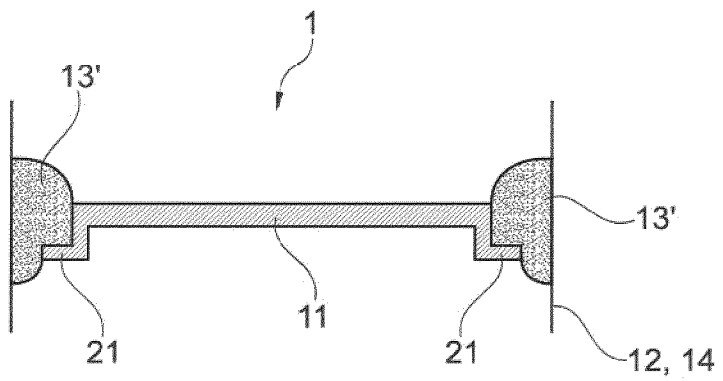
Figure 3:
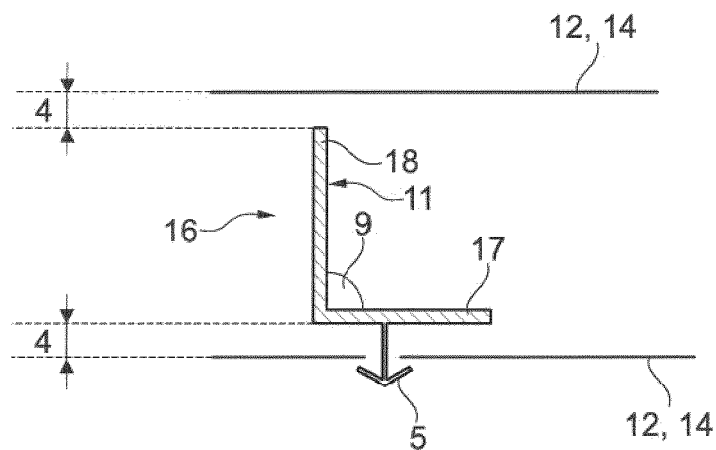
FIG. 3 shows a schematic illustration of an exemplary device in a structural element.

FIG. 3 shows, schematically and by way of example, a device 16 in a structural element 12, 14 in a cross-sectional illustration. In this exemplary embodiment, the device 16 has a carrier 11 with an L-shaped cross section. In this respect, a first leg forms a base 17 of the carrier, and a second leg forms a wing 18. The base 17 and the wing 18 form an angle 9 which amounts to approximately 90° in this exemplary embodiment. A fastening element 5 is arranged on the base 17. The device 16 is arranged on the structural element 12, 14 by virtue of this fastening element 5. In this exemplary embodiment, the fastening element 5 is in the form of a clip.

In this exemplary embodiment, a distance 4 between the carrier 11 and the structural element 12, 14 amounts to approximately 4 mm. Such a distance 4 makes it possible on the one hand to coat the structural element 12, 14 with a finishing liquid prior to an expansion of the expandable adhesive, and allows the carrier 11 on the other hand to effectively delimit an expansion of the expandable adhesive in at least one direction.

Figure 4A:
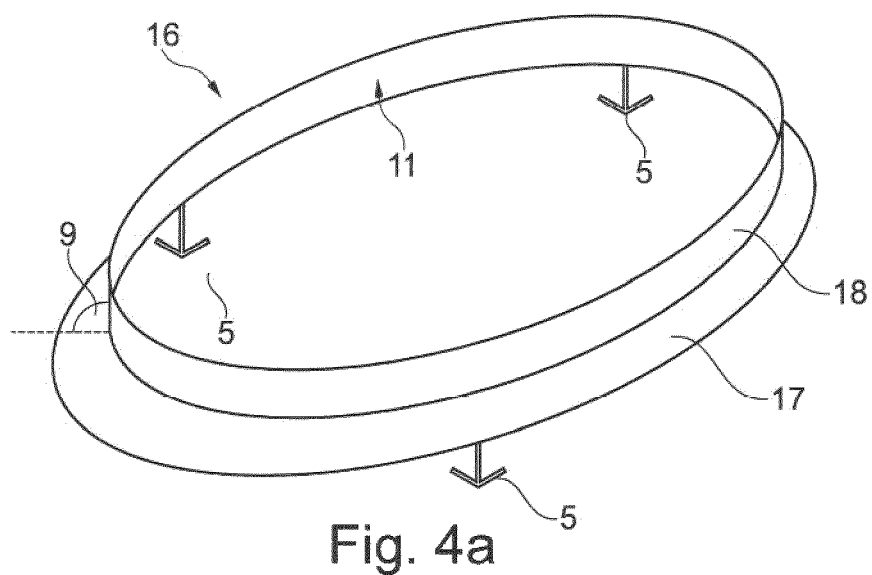
FIGS. 4a and 4b show schematic illustrations of exemplary devices.
Figure 4B:
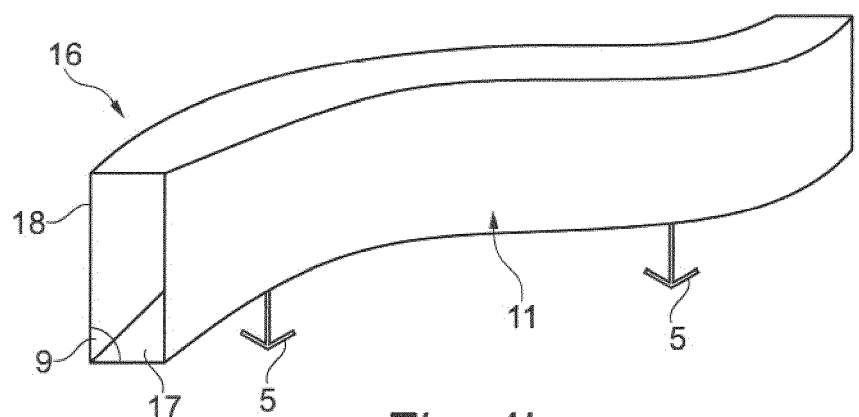

FIGS. 4a and 4b depict, schematically and by way of example, two different devices 16 in a three-dimensional illustration. The device 16 in FIG. 4a has a substantially circular outline. In addition, the carrier 11 in this exemplary embodiment in turn has a substantially L-shaped cross section. In this case, the carrier 11 has a base 17 and a wing 18, which form an angle 9. In this exemplary embodiment, arranged on the base 17 are three fastening elements 5 for arranging the device 16 on a structural element.

The device 16 in FIG. 4b has a rectangular cross section. In this case, the device 16 has an elongate form and/or has an elongate outline. In turn, the carrier 11 of the device 16 has a base 17 and a wing 18, which form an angle 9. In this exemplary embodiment, the base 17 and the wing 18 are supplemented by further walls of the carrier 11. In this exemplary embodiment, arranged on the base 17 of the carrier 11 are two fastening elements 5 for arranging the device 16 in a structural element.

FIGS. 5a to 6b illustrate, schematically and by way of example, systems 1 for insulating a structural element 12, 14.

Figure 5A:
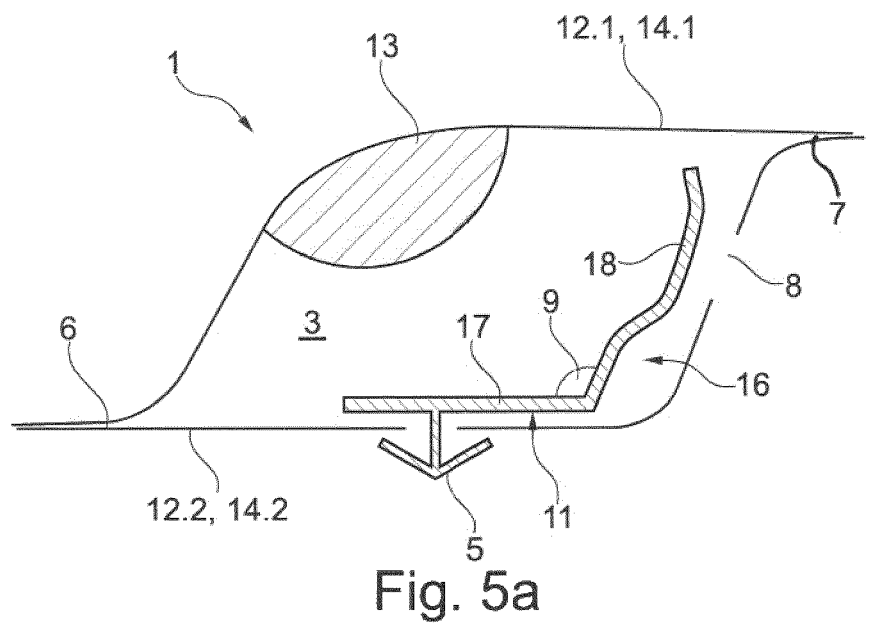
FIGS. 5a to 6b show schematic illustrations of exemplary systems for insulating structural elements.
Figure 5B:
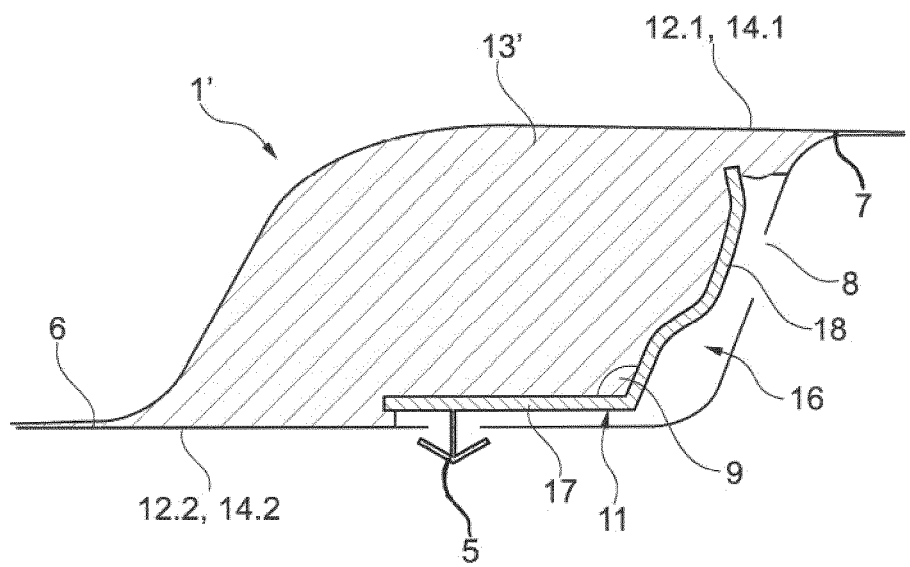

FIGS. 5a and 5b illustrate a system 1, wherein the expandable adhesive 13 is arranged on the structural element 12, 14. In this exemplary embodiment, the expandable adhesive 13 is arranged on a first constituent part 12.1, 14.1 of the structural element, and the device 16 is arranged on a second constituent part 12.2, 14.2 of the structural element. The two constituent parts 12.1, 14.1, 12.2, 14.2 of the structural element are joined together at a first joining point 6 and at a second joining point 7. In the process, the structural element 12, 14 forms a cavity 3 in which both the expandable adhesive 13 and the device 16 are arranged.

The device 16 comprises a carrier 11 and a fastening element 5. The carrier 11 has a base 17 and a wing 18, which form an angle 9. The wing 18 is arranged here in front of an opening 8 in the structural element 12, 14. As a result, the carrier 11 and in particular the wing 18 thereof delimits the expansion of the expandable adhesive 13 in the direction of this opening 8, and therefore the expandable adhesive 13' cannot pass into the region of the opening 8. This can be seen in FIG. 5b, in which the system 1' is illustrated after the expandable adhesive 13 has been expanded.

Figure 6A:
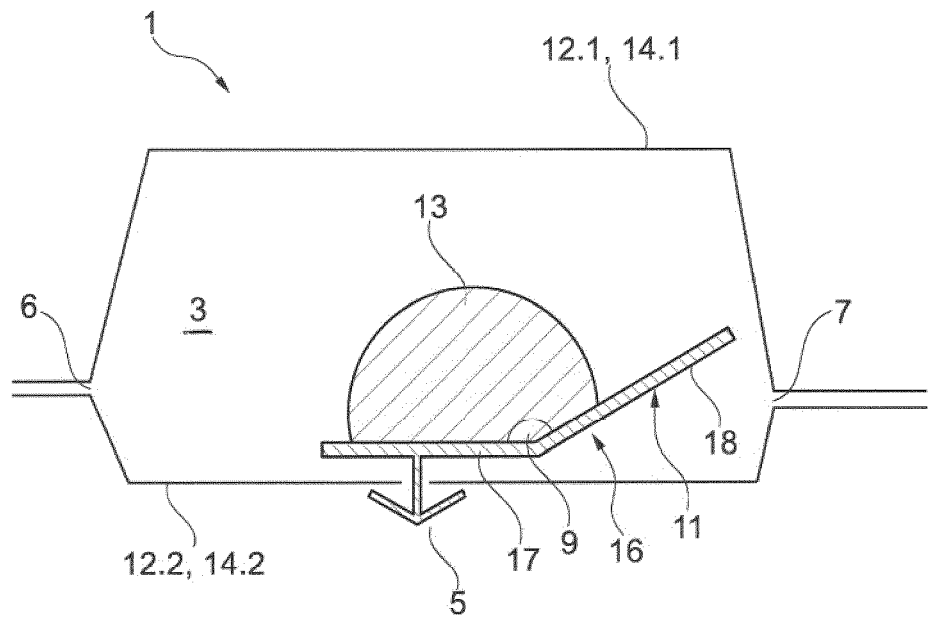
Figure 6B:
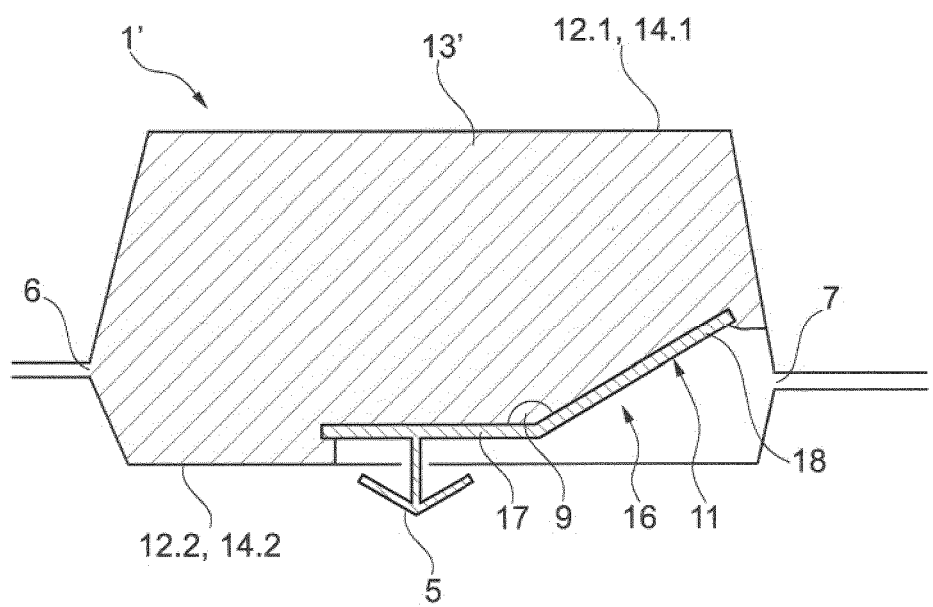

FIGS. 6a and 6b illustrate a further exemplary system 1 for insulating a structural element 12, 14. By contrast to the system 1 in FIGS. 5a and 5b, in this exemplary embodiment the expandable adhesive 13 is arranged not on the structural element 12, 14, but rather on the carrier 11. In this respect, the expandable adhesive 13 is arranged on the carrier 11 by pumping or extruding in the form of a bead.

In turn, the carrier 11 delimits an expansion of the expandable adhesive 13 in at least one direction, with the result that a predetermined region of the structural element 12, 14 and/or the cavity 3 thereof remains free of expanded adhesive 13' after the expandable adhesive 13 has been expanded. This is illustrated in FIG. 6b.

LIST OF REFERENCE SIGNS

1 System
3 Cavity
4 Distance
5 Fastening element
6 First joining point
7 Second joining point
8 Opening
9 Angle
10 Vehicle body
11 Carrier
12 Structural element
12.1 First constituent part
12.2 Second constituent part
13 Expandable adhesive
14 Structural element
14.1 First constituent part
14.2 Second constituent part
16 Device
17 Base
18 Wing
21 Edge region

The invention claimed is:

1. A system for insulating a structural element in a motor vehicle, the system comprising:
a structural element having a first constituent part and a second constituent part, the constituent parts being joined together at a first joining point and at a second joining point, and the structural element forming a cavity;
a device having a carrier, the carrier being arranged on the structural element by virtue of a fastening element; and
an expandable adhesive, which is arranged on the structural element or on the carrier by pumping or by extruding within the structural element,
wherein the carrier and the expandable adhesive are formed and arranged in such a way that the carrier delimits the expandable adhesive in at least one direction as the adhesive expands, and
a distance between the carrier and the structural element in the at least one direction is smaller than a distance between the carrier and the structural element in a direction opposite to the at least one direction.

2. The system as claimed in claim 1, wherein the carrier is arranged on the first constituent part of the structural element, and the expandable adhesive is arranged on the second constituent part of the structural element.

3. The system as claimed in claim 1, wherein the carrier has a base and a wing, and the fastening element is arranged on the base and the wing delimits the expansion of the expandable adhesive in at least one direction.

4. The system as claimed in claim 3, wherein the wing and the base form an angle of between 60° and 160°.

5. The system as claimed in claim 1, wherein the device has been produced by an injection-molding process and/or the device consists of only one material and/or wherein the device is formed in one piece.

6. The system as claimed in claim 1, wherein the device has a substantially circular or oval or elongate or irregularly shaped outline.

7. The system as claimed in claim 1, wherein the expandable adhesive has an expansion rate of at least 200%.

8. The system as claimed in claim 1, wherein the expandable adhesive is arranged on the structural element or on the carrier in the form of a bead or a plurality of beads.

9. The system as claimed in claim 1, wherein the expandable adhesive is in the form of a cohesive element or in the form of a plurality of non-cohesive elements.

10. The system as claimed in claim 1, wherein the fastening element is in the form of a clip.

11. The system as claimed in claim 1, wherein the structural element has an opening, and the carrier is arranged in such a way that the opening is free of expanded adhesive after the expandable adhesive has been expended.

12. The system as claimed in claim 1, wherein a distance between the carrier and the structural element amounts to between 2 and 6 mm.

13. A method for insulating a structural element in a motor vehicle, the method comprising the steps of:
providing a device having a carrier;
arranging the device on the structural element;
arranging an expandable adhesive on the structural element or arranging the expandable adhesive on the carrier by pumping or by extruding after the carrier is on the structural element;
joining a first constituent part and a second constituent part of the structural element to form the structural element, wherein the device and the expandable adhesive are arranged in a cavity between the constituent parts of the structural element; and
expanding the expandable adhesive, the carrier delimiting the expansion of the expandable adhesive in at least one direction.

14. The method as claimed in claim 13, wherein the expandable adhesive is arranged by pumping or by extruding at a temperature of less than 80° C. and/or the expandable adhesive is expanded at a temperature of more than 100° C.

15. The method as claimed in claim 13, wherein the method is carried out by a system for insulating the structural element in the motor vehicle, the system comprising:
the structural element having the first constituent part and the second constituent part, the constituent parts being joined together at the first joining point and at the second joining point, and the structural element forming the cavity;

the device having the carrier, the carrier being arranged on the structural element by virtue of a fastening element; and the expandable adhesive, which is arranged on the structural element or on the carrier by pumping or by extruding;

wherein the carrier and the expandable adhesive are formed and arranged in such a way that the carrier delimits the expandable adhesive in the at least one direction as the adhesive expands.

16. A system for insulating a structural element in a motor vehicle, the system comprising:

a structural element having a first constituent part and a second constituent part, the constituent parts being joined together at a first joining point and at a second joining point, and the structural element forming a cavity;

a device having a carrier, the carrier being arranged on the structural element by virtue of a fastening element; and a separate expandable adhesive, which is arranged on the structural element by pumping or by extruding, wherein the separate expandable adhesive is not applied on the carrier, and the carrier and the separate expandable adhesive are formed and arranged in such a way that the carrier delimits the separate expandable adhesive in at least one direction as the adhesive expands.

* * * * *